No. 894,354. PATENTED JULY 28, 1908.
R. M. VICK.
FILE CLIP.
APPLICATION FILED OCT. 4, 1907.
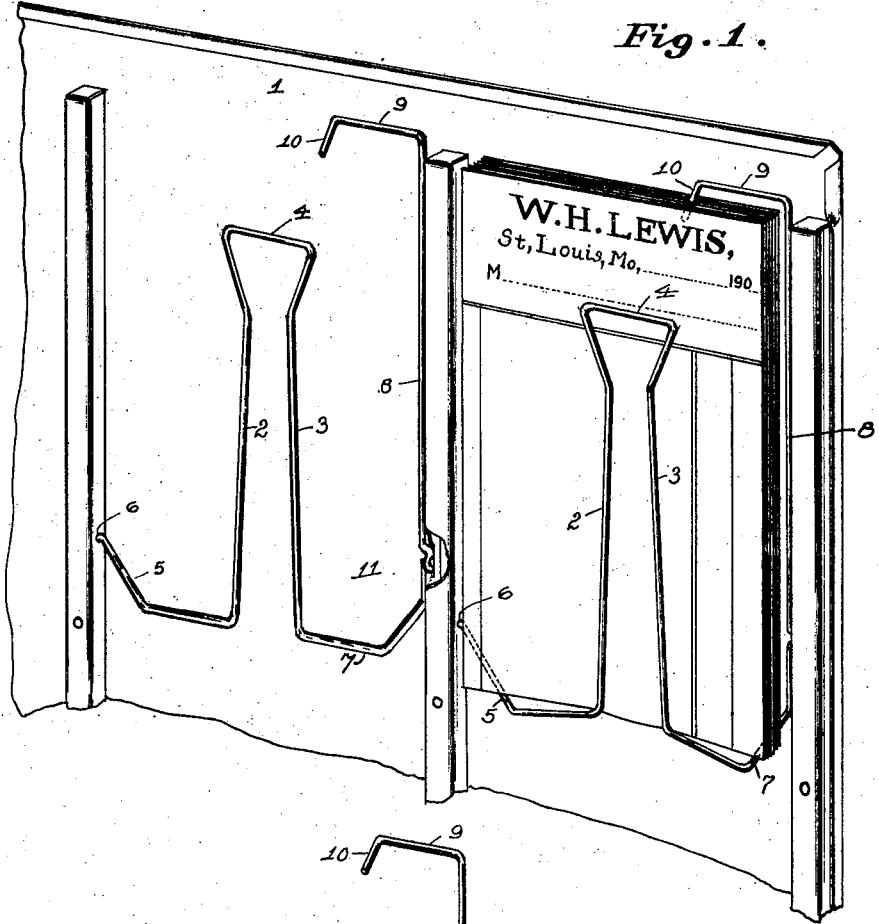
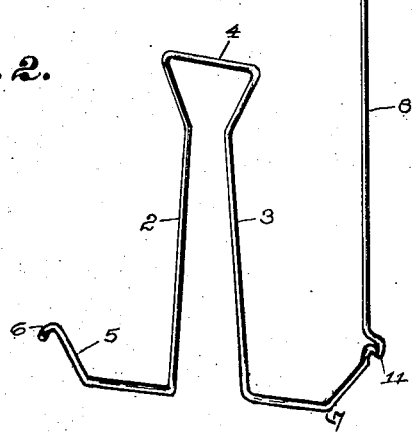

UNITED STATES PATENT OFFICE.

ROLLO M. VICK, OF ALLIANCE, OHIO.

FILE-CLIP.

No. 894,354.     Specification of Letters Patent.     Patented July 28, 1908.

Application filed October 4, 1907. Serial No. 395,861.

*To all whom it may concern:*

Be it known that I, ROLLO M. VICK, a citizen of the United States, residing at Alliance, in the county of Stark and State of Ohio, have invented certain new and useful Improvements in File-Clips; and I do hereby declare that the following is a full, clear, and exact description of the same, reference being had to the annexed drawing, making a part of this specification, and to the numerals and figures of reference marked thereon, in which—

Figure 1 is a view showing two file clips, and a portion of a leaf or base of a leaf or plate illustrating the clips properly connected. Fig. 2 is a detached view of a file clip.

The present invention has relation to file clips designed for temporarily filling credit slips or other memoranda slips wherein it is desired to separate or divide certain numbers of slips from other certain numbers that is to say the clip has specific reference to the filing of the credit slips filed for a given time, say a day, which represents the credit for the day's business and the total of the various amounts upon the various credit slips can be ascertained at the end of a day's business or other predetermined period of time. This object and purpose is carried out as hereinafter described.

Similar numerals of reference indicate corresponding parts in all the figures of the drawings.

In the accompanying drawing, 1 represents a portion of a plate or leaf which may be one of a series of credit slips or leaves. The clip proper consists of a single piece of wire bent into substantially the form shown in the drawing, and as shown it consists of two center members 2 and 3 joined together at their top or upper ends by the integral connecting portion or part 4. From the lower center member 2 extends the portion 5, the extreme outer end of which is provided with the hook 6. From the bottom or lower end of the center member 3 extends the integral portions 7, from which extends the integral portion 8 the extreme top or upper end of which is provided with the angled portion 9, from which extends the downward bent portion 10. The integral portion 8 is formed of such a length that it will come slightly above the top or upper ends of the credit slips and the downward extended portion 10 carried far enough or extended a distance, sufficient to permit a portion of said part 10 to come between two credit slips.

In use let it be supposed that no credit slips are connected or placed in position to be held by the clips, but as the slips accumulate during the business day they are placed in position but the part or integral portion 10 remains back of all the credit slips or in other words between the first placed credit slip and the leaf 1. At the close of the business day the various amounts upon the various credit slips are computed and the total noted for the credit given for the day, after which the arm or portion 8 is brought into position so as to bring the division or downward portion 10 on top of the outer or last placed credit slip, which credit slips so located between the member 10 and the leaf 1 represents the day's business. In starting the second day's business the credit slips are placed from time to time, so as to be held by the clip proper but on top of the downward extended portion 10, which downward extended portion divides the credit slips for the two days' accumulations of slips and at the end of the second day's business the amount is computed upon the slips located above or over the downward extended portion 10.

For the purpose of providing means for connecting the clip proper to a leaf or other device for carrying the clip and credit slips, the hook 6 and the bent or looped extension 11 are provided and are designed to be seated in suitable apertures to hold the clips proper. The center members 2 and 3 are free to be moved away from the plate or leaf, which I have illustrated in Fig. 1, thereby allowing any desired number of slips to be placed in position to be clamped. By providing the downward extending arm or member 10 and bringing said member on top of the outer slip all of the slips back of said arm will be held in a firm and compact position and not liable to become detached or mis-placed, by any movement of the leaf or leaves to which the clips are attached.

Having fully described my invention what I claim as new and desire to secure by Letters Patent, is—

1. As an improved article of manufacture, a base, a clip, means for connecting the base and clip together, said clip formed of a single piece of wire and consisting of two like members spaced from each other, said like members connected together at their upper ends, their lower ends provided with lateral members, one of said members provided with a hook and the other provided with a looped extension, an integral member extended from the looped extension upward and provided with a lateral and downward extended portion.

2. As an improved article of manufacture, a base, a clip, means for connecting said clip and base together, said clip formed of a single piece of wire, consisting of two substantially parallel spaced members, said members connected together at their top or upper ends and their lower ends spaced from each other, said lower ends provided with integral lateral members, an integral member extended from one of said lateral members above the tops of the connected member, said extended member provided with angled member, substantially as and for the purpose specified.

In testimony that I claim the above, I have hereunto subscribed my name in the presence of two witnesses.

ROLLO M. VICK.

Witnesses:
EMMA SCHMIDT,
ELLA WHITACRE.